(12) United States Patent
Bhatt et al.

(10) Patent No.: US 10,740,736 B2
(45) Date of Patent: Aug. 11, 2020

(54) METHOD AND SYSTEM FOR FACILITATING PAYMENT OF CREDIT CARD BILLS

(71) Applicant: MasterCard Asia/pacific Pte Ltd, Singapore (SG)

(72) Inventors: Suneel Bhatt, Delhi (IN); Amit Singh, Lucknow (IN); Hitendra Gehlot, Ghaziabad (IN)

(73) Assignee: MASTERCARD ASIA/PACIFIC PTE LTD, Singapore (SG)

( * ) Notice: Subject to any disclaimer, the term of this patent is extended or adjusted under 35 U.S.C. 154(b) by 989 days.

(21) Appl. No.: 15/074,957

(22) Filed: Mar. 18, 2016

(65) Prior Publication Data

US 2016/0275463 A1   Sep. 22, 2016

(30) Foreign Application Priority Data

Mar. 20, 2015   (SG) .......................... 10201502192Y

(51) Int. Cl.
*G06Q 20/34* (2012.01)
*G06Q 20/10* (2012.01)
*G06Q 20/40* (2012.01)

(52) U.S. Cl.
CPC .......... *G06Q 20/102* (2013.01); *G06Q 20/34* (2013.01); *G06Q 20/405* (2013.01)

(58) Field of Classification Search
CPC ...... G06Q 20/00; G06Q 20/34; G06Q 20/405; G06Q 20/102
USPC ........................................................ 705/40
See application file for complete search history.

(56) References Cited

U.S. PATENT DOCUMENTS

| | | | |
|---|---|---|---|
| 8,612,347 B1 | 12/2013 | Dabney | |
| 2002/0156846 A1* | 10/2002 | Rawat | G06Q 40/04 709/203 |
| 2014/0344011 A1 | 11/2014 | Dogin et al. | |
| 2015/0324770 A1* | 11/2015 | Starikova | G06Q 20/102 705/40 |

FOREIGN PATENT DOCUMENTS

KR   20060011789 A   2/2006

OTHER PUBLICATIONS

Search Report and Written Opinion dated Dec. 6, 2018 by the Intellectual Property Office of Singapore for Patent Application No. 10201502192Y, which was filed on Mar. 20, 2015 (Inventor—Bhatt et al.; Applicant—MasterCard Asia/Pacific TE, Ltd.) (8 pages).

* cited by examiner

*Primary Examiner* — Robert R Niquette
*Assistant Examiner* — Liz P Nguyen
(74) *Attorney, Agent, or Firm* — Ballard Spahr LLP

(57) ABSTRACT

A system for processing payment card transactions. A user database stores a plurality of user profiles. Each user profile mappings from a payment card identifier to at least one credit card number. A bill processing component in communication with the database which is configured to: receive, from a credit card issuer system, credit card bill data representing at least a credit card number, a total payable amount and a minimum payable amount; query the user database to match one of the user profiles to the credit card number; and store, in the matched user profile, the credit card bill data.

20 Claims, 5 Drawing Sheets

… (US 10,740,736 B2)

METHOD AND SYSTEM FOR FACILITATING PAYMENT OF CREDIT CARD BILLS

RELATED APPLICATION

This application claims priority to Singapore Application No. 10201502192Y, entitled METHOD AND SYSTEM FOR FACILITATING PAYMENT OF CREDIT CARD BILLS, filed Mar. 20, 2015 and is hereby incorporated by reference in its entirety.

BACKGROUND

The present invention relates to methods and systems for facilitating payment of credit card bills.

Credit cards are an almost ubiquitous form of payment device used for carrying out financial transactions such as purchases at bricks-and-mortar or online retailers. It is relatively common for consumers to hold multiple credit cards linked to different accounts, and possibly issued by different financial institutions. Typically, a bill for each card will issue once per month, and making payment when there are multiple cards may be burdensome for the consumer.

Usually, credit card payments are made by one of the following three methods:

1) Cheque: The account holder has to visit a drop box or other physical deposit facility offered by the financial institution to deposit a cheque. Occasionally the account holder may forget to deposit the cheque, thus missing the payment deadline. In some cases if the deadline has been missed, the account holder may deposit a back-dated cheque in order to attempt to avoid any penalties. This is difficult for financial institutions to detect, and in the event of a dispute over the cheque date it may be more cost efficient for them to simply concede the point, rather than chasing late payment fees.

2) Electronic payment via online banking: In this case the account holder needs to add the details of each card as a payee in their online banking account. Each month when a payment is due, the account holder needs to login into their online banking account, enter the payment amount for each card, and approve the payment. Although more efficient than cheque payment, if there are several cards it may still be laborious, and still requires that the account holder remember to make payment before the deadline. Further, sometimes account holders may not want to share, with the bank which operates the online banking account, details of cards held with other issuing banks.

3) Direct online payment: In this case the account holder must visit the issuer bank's website, and make a payment via the issuer bank's payment portal. This is time consuming, and if multiple cards are to be paid, multiple logins are required to make payments.

SUMMARY

A system for processing payment card transactions comprises: a database configured to store a plurality of user profiles, each user profile comprising a mapping from a payment card identifier of a payment card to at least one credit card number; a bill processing component in communication with the database, the bill processing component being configured to: receive, from a card issuer system over a communications network, credit card bill data representing at least a credit card number, a total payable amount and a minimum payable amount; query the database to match the credit card number to one of the user profiles; and store, in the matched user profile, the credit card bill data; and a bill payment component which is configured to: generate, from the credit card bill data and the payment card identifier of the matched profile, a transaction authorisation request comprising the payment card identifier of the matched profile, the credit card number, and a payment amount; and transmit, to a payment network, the transaction authorisation request.

Advantageously, the use of a bill processing component to match credit card bill data to a stored user profile allows multiple credit cards associated with the user profile to be paid automatically using the payment card, without requiring any intervention from the user. The user may cause to be stored, in the user profile, a plurality of credit card numbers, and a date and time at which the bill for each credit card, as received from the respective card issuer systems, is to be paid. Furthermore, by the use of stored user profiles matched to the credit card bill data, the amount of traffic over the communications network may be reduced since the user need only communicate with the system once in order to set up each credit card in his or her profile, rather than logging in each time to make a payment.

In another aspect, a computer-implemented method comprises: storing a plurality of user profiles in a user database, each user profile comprising a mapping from a payment card identifier to at least one credit card number; receiving, by a bill processing component from a credit card issuer system, credit card bill data representing at least a credit card number, a total payable amount and a minimum payable amount; querying the user database using the bill processing component to match one of the user profiles to the credit card number, and storing the credit card bill data in the matched user profile; generating, by a bill payment component from the credit card bill data and the payment card identifier of the matched profile, a transaction authorisation request comprising the payment card identifier of the matched profile, the credit card number, and a payment amount; and transmitting, by the bill payment component to a payment network via the credit card issuer system, the transaction authorisation request.

In a further aspect, a non-transitory computer-readable medium has machine-readable instructions stored thereon which, when executed by at least one processor, cause the at least one processor to: store a plurality of user profiles in a user database, each user profile comprising a mapping from a payment card identifier to at least one credit card number; receive, from a credit card issuer system, credit card bill data representing at least a credit card number, a total payable amount and a minimum payable amount; query the user database using the bill processing component to match one of the user profiles to the credit card number, and storing the credit card bill data in the matched user profile; generate, from the credit card bill data and the payment card identifier of the matched profile, a transaction authorisation request comprising the payment card identifier of the matched profile, the credit card number, and a payment amount; and transmit, to a payment network via the credit card issuer system, the transaction authorisation request.

BRIEF DESCRIPTION OF THE DRAWINGS

Embodiments of the invention will now be described, by way of non-limiting example only, with reference to the accompanying drawings in which.

DETAILED DESCRIPTION OF EMBODIMENTS

As used herein, the term "database" may refer to a body of data, a relational database management system (RD-BMS), or both. A database may include any collection of data including hierarchical databases, relational databases, flat file databases, object-relational databases, object oriented databases, and any other structured collection of records or data that is stored in a computer system. The above examples are for illustration only, and are not intended to limit in any way the definition and/or meaning of the term database.

As used herein, the terms "payment device", "transaction card," "financial transaction card," and "payment card" refer to any suitable cashless payment device, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, transponder devices, NFC-enabled devices, and/or computers. Each type of payment card can be used as a method of payment for performing a transaction.

The systems and processes of the presently described embodiments permit a user to automatically pay some or all of the balance of one or more credit cards, using a payment card which is not associated with a line of credit. The payment card may be linked to a deposit account (such as a transactional account or demand deposit account, money market account, savings account or call deposit account), or may be any other payment device having a positive balance, such as a prepaid card, for example.

Figure 1:
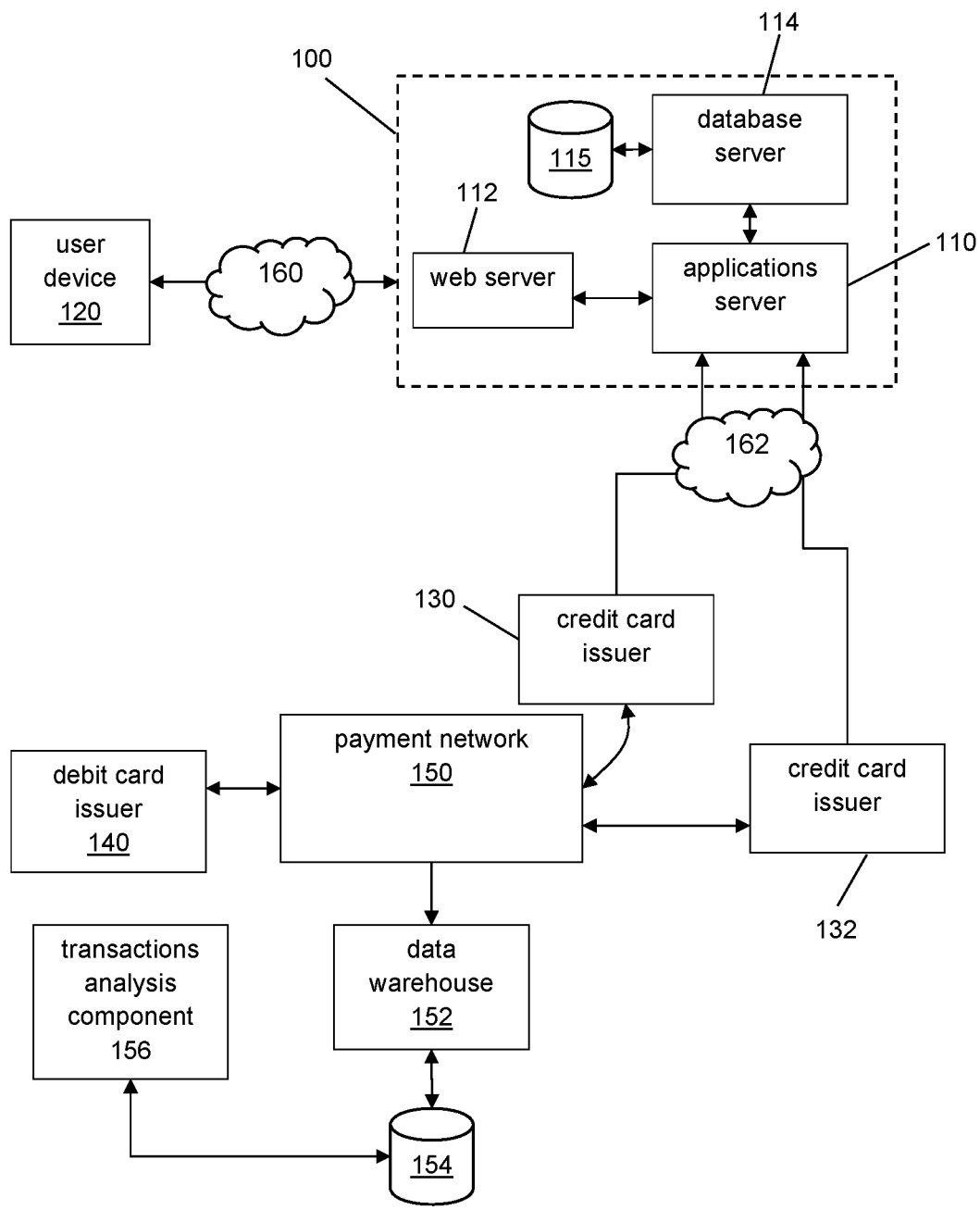
FIG. 1 is a block diagram showing a system for processing payment card transactions, in communication with a payment network and a user device.

Referring to FIG. 1, there is shown a system 100 for processing payment card transactions. The system 100 may comprise an applications server 110 in communication with a web server 112 and a database server 114. In some embodiments the web server 112 may be a web cluster comprising one or more physical devices. Likewise, the database server 114 may be a database cluster comprising one or more physical devices which are in communication with one another over a communications network such as a local-area or wide-area network. In other embodiments, the web server 112 and database server 114 may be components of applications server 110.

The system 100 is in communication with a user device 120. The user device 120 may be a portable computing device such as a mobile phone, smartphone, or tablet, or may be a laptop or desktop computing device. User device 120 communicates with the web server 112 and/or applications server 110 of the system 100 over a wide-area network 160 such as the public Internet. User device 120 may establish a secure connection using a secure protocol such as HTTP layered on TLS/SSL (HTTPS), and/or Secure Hypertext Transfer Protocol (S-HTTP). In some embodiments the user device 120 may establish a virtual private network (VPN) connection with web server 112 and/or applications server 110.

In general terms, the system 100, via applications server 110, receives credit card bill data from respective computer systems of a plurality of credit card issuers 130, 132 which are registered with the system 100 and with the payment network 150. Only two credit card issuers are depicted in FIG. 1, but in general there may be many more than two. The applications server 110 processes the credit card bill data, and matches the respective bills to user profiles stored in database 115, based on one or more credit card numbers extracted from the credit card bill data. Each user profile stores details of a registered payment card (e.g., a card identifier), such as a debit card, and one or more credit cards to be paid using the debit card and to which the applications server 110 matches the bills submitted by credit card issuers 130, 132. Based on settings in the respective user profiles, the applications server 110 then initiates a payment of at least part of the total amount of each bill from the account linked to the debit card to the respective accounts linked to the credit cards.

For example, as shown in FIG. 1, applications server 110 analyses the credit card bill data to determine which credit card issuer 130 or 132 has transmitted a bill, and generates a transaction authorisation request for a payment amount (which is some or all of the total amount of the bill). The transaction authorisation request includes at least the identifier of the debit card and the payment amount, and may include other information such as the expiration date, the billing address (used for address verification system (AVS) validation), and the card verification value (CVV) number (if entered) of the debit card. Applications server 110 transmits the transaction authorization request to the computer systems of credit card issuer 130 or 132, which then routes the transaction request to a payment network 150 for processing of the payment.

The payment network 150 acts as an intermediary to effect payment from the user using a payment device registered in their user profile, to a credit account linked to a credit card number registered in the user profile. Exemplary payment networks are those operated by MasterCard, Inc. or Visa, Inc.

In particular, if the applications server 110 determines that the credit card bill corresponds to a credit card issued by credit card issuer 130 (e.g., based on the issuer identification number, or IIN, derived from the primary account number, or PAN, of the credit card), the computer system of issuer 130 routes the transaction authorisation request to computer systems of the payment network 150. The transaction authorisation request is then routed by payment network 150 to computer systems of the debit card issuer 140 based on information contained in the transaction authorisation request. The debit card issuer 140 is authorised by payment network 150 to issue payment devices 110 on behalf of customers 120 to perform transactions over the payment network 150. Debit card issuer 140 also provides funding of the transaction to the payment network 150 for transactions that are approved.

The computer systems of debit card issuer 140 analyse the authorisation request to determine the account number (e.g., the primary account number or PAN) corresponding to the registered payment card, and based on the account number, determine whether the account is in good standing and whether the transaction amount is covered by the cardholder's account balance. Based on this, the transaction can be approved or declined, and an authorisation response message transmitted from debit card issuer 140 to the payment network 150. If approved, the debit card issuer system 140 puts a hold on the necessary funds included within the account to ensure that sufficient funds are available to pay the credit card bill. The payment network 150 routes the authorisation response message to the credit card issuer system 130. Credit card issuer system 130, in turn, sends the authorisation response message to the applications server 110. If the authorisation response message indicates that the transaction is approved, then the account corresponding to the credit card is credited by the amount of the transaction.

During each authorisation request as described in the previous paragraphs, the payment network 150 stores transaction information in a transactions database 154 accessible via a database cluster 152. In some embodiments, the transactions database 154 may be distributed over multiple devices which are in communication with one another over a communications network such as a local-area or wide-area network. The database cluster may be a data warehousing system comprising a data warehouse database 154 which may store copies of the transaction data, and/or cleaned and/or aggregated data which are transformed versions of the transaction data. Transaction records (or aggregated data derived therefrom) may be directly accessible for the purposes of performing analyses on the transaction data, as will be described in more detail below.

The transaction records may comprise a plurality of fields, including the transaction environment or method being used to conduct the transaction; the transaction type; card identifier (e.g., card number); time and date; location (full address and/or GPS data); transaction amount; and response code (also referred to herein as authorization code). Other fields may be present in each transaction record.

Figure 2:
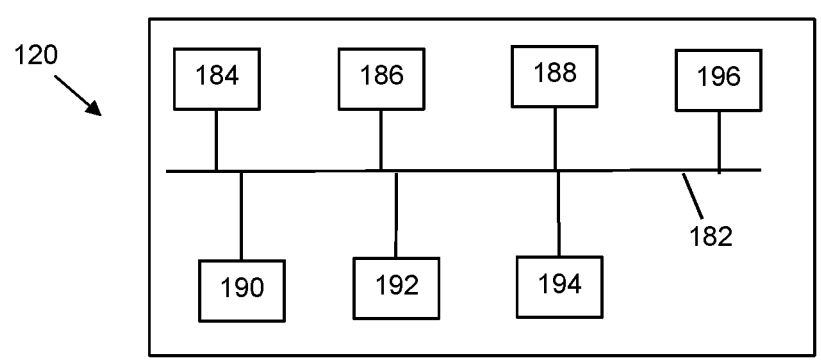
FIG. 2 is a block diagram of a user device of FIG. 1.

User device 120 is shown in more detail in FIG. 2. The user device 120 may be a mobile communications device such as a mobile phone, a smartphone, a tablet, a laptop, or a personal digital assistant ("PDA"). In other embodiments the user device 120 may be a desktop computer system. The user device 120 is arranged to receive information from and output information to a user of the user device 120. The user device 120 may comprise a central processing unit ("CPU") or "processing module" 184, a touch screen 186, a memory 188 for storing data, a network interface 190, input devices such as a camera 192 and a microphone 194, and output devices such as speakers 196, all interconnected by a bus 182. The touch screen 186, memory 188, network interface 190, camera 192, microphone 194 and speakers 196 may be integrated into the user device 120 as shown in FIG. 2. In alternative user devices one or more of the touch screen 186, memory 188, network interface 190, camera 192, microphone 194 and speakers 196 may not be integrated into the user device 120 and may be connected to the CPU 184 via respective interfaces. One example of such an interface is a USB interface.

User device 120 interacts with the system 100 via processes executed by the user device 120 which are implemented in the form of programming instructions of one or more software modules or components stored on memory 188 associated with the user device 120. The software modules or components may comprise a client application such as a web browser component (such as Internet Explorer of Microsoft, Inc., Safari of Apple, Inc. or Chrome of Google, Inc.) and/or a special purpose payment client software application ("app") for receiving input from the user, transmitting it to system 100, and receiving the results of processing from system 100 and displaying them to the user on display 186. User device 120 may also have stored, on memory 188, a number of standard modules such as an operating system (e.g., Microsoft Windows, Linux, iOS or Android), and data associated with the web browser component (such as cookies or other browsing data) and/or the payment client component.

The browser component communicates with web server 112 to securely submit HTTP requests over the network 160 and to receive response messages (each of which may contain completion status information about the request and may also contain requested content in the message body) from the web server 112. In some embodiments the payment client component may instead communicate with web server 112 via HTTPS. Alternatively, the payment client component may communicate directly with applications server 110 via a TCP socket or UDP socket.

A user may access, via browser component or payment client component, the web server 112 to register credit cards to be paid by a debit card issued by the issuer. Using the web site 112, the user submits information regarding the credit card to be paid, the number of the credit card, how much of the bill is to be paid (full amount, minimum payment amount, etc.), and when it is to be paid (e.g., immediately on receipt of the bill, or at the end of the month or some other fixed date). The submitted information is stored in a user profile by the database server 114 connected to the applications server 110. The applications server 110 may then make payments of the credit card bills according to a user-defined schedule as outlined above. The user may communicate with web server 112 via the browser component or the payment client component to access his or her user profile, update it (e.g., by amending the debit card number, adding or deleting a credit card, amending personal details such as address, etc.) and then causing the updated profile to be saved to database 115.

Figure 3:
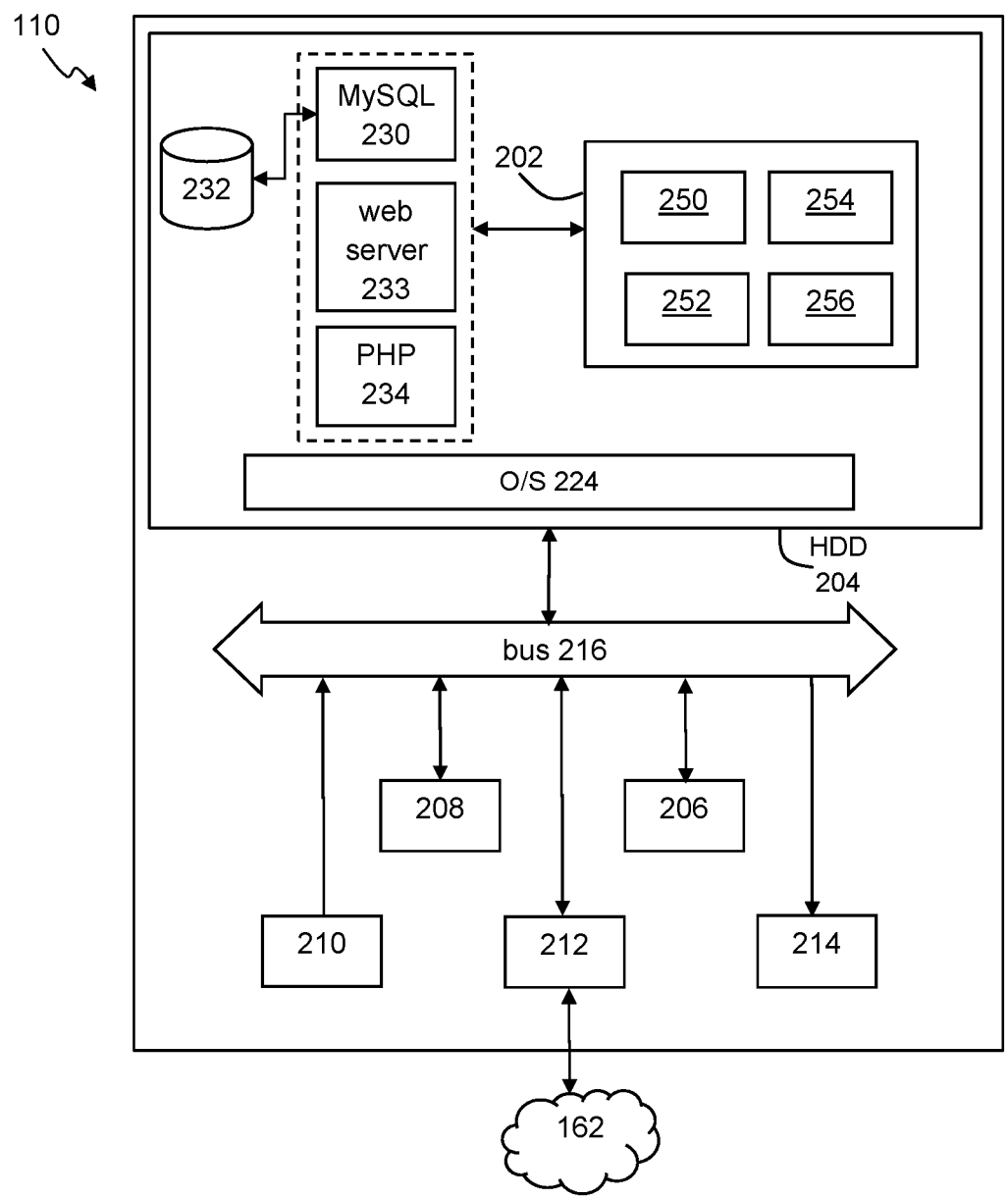
FIG. 3 is a block diagram of an applications server of the system of FIG. 1.

The applications server 110 is illustrated in more detail in FIG. 3. In the presently described embodiments, the applications server is a standard computer system such as an Intel IA-32 based computer system 110, as shown in FIG. 3, and at least some of the processes executed by the system 100 are implemented in the form of programming instructions of one or more software modules or components 202 stored on tangible and non-volatile (e.g., solid-state or hard disk) storage 204 associated with the computer system 110, as shown in FIG. 3. However, it will be apparent that the processes could alternatively be implemented, either in part or in their entirety, in the form of one or more dedicated hardware components, such as application-specific integrated circuits (ASICs), and/or in the form of configuration data for configurable hardware components such as field programmable gate arrays (FPGAs), for example.

As shown in FIG. 3, the computer system 110 includes standard computer components, including random access memory (RAM) 206, at least one processor 208, and external interfaces 210, 212, 214, all interconnected by a bus 216. The external interfaces include universal serial bus (USB) interfaces 210, and a network interface connector (NIC) 212 which connects the system 110 to a communications network 160 or 162. In some embodiments the same network 160, for example the Internet, as used for communications between the user device 120 and the system 100 may be used by applications server 110 to communicate with credit card issuer systems 130, 132.

The computer system 110 also includes a number of standard software modules, including an operating system 224 such as Linux or Microsoft Windows. The computer system 110 may include structured query language (SQL) support 230 such as MySQL, available from http://www.mysql.com, which allows data to be stored in and retrieved from the user database 115, and/or from a separate locally stored database 232. The computer system 110 may also include web server software 233 such as Apache, available at http://www.apache.org, and scripting language support 234 such as PHP, available at http://www.php.net, or Microsoft ASP.

Together, the web server 233, scripting language 234, and SQL modules 230 provide the system 110 with the general ability to allow client computing devices 120 equipped with standard web browser software to access the system 110 and in particular to provide data to and receive data from the database 115 or 232.

However, it will be understood by those skilled in the art that the specific functionality provided by the system 110 to such users may be provided by scripts accessible by the web server 233, including the one or more software components 202 implementing the processes described below with reference to FIG. 4 and FIG. 5, and also any other scripts and supporting data, including markup language (e.g., HTML, XML) scripts, PHP (or ASP), and/or CGI scripts, image files, style sheets, and the like.

The software components 202 stored on storage medium 204 may include a bill processing component 250, a bill payment component 252, a payment scheduling component 254, and a card registration component 256. The bill processing component 250 receives credit card bill data from credit card issuer systems 130, 132, and processes the credit card bill data to match credit card bills to user profiles stored in the user database 115.

The bill payment component 252 generates, for each matched profile from the credit card bill data and the payment card identifier of the matched profile, a transaction authorisation request comprising the payment card identifier of the matched profile, a credit card number derived from the credit card bill data, and a payment amount.

The payment scheduling component 254 determines, from the matched user profile, a time and date at which the transaction authorisation request should be submitted to the payment network 150, and communicates with the bill payment component 252 to cause the bill payment component 252 to transmit, to a payment network via the credit card issuer system, the transaction authorisation request.

The card registration component 256 enables user device 120 to create a user profile in which a payment card identifier is associated with one or more credit card numbers, and stores the user profile in the user database 115. The card registration component 256 may also enable user device 120 to retrieve, edit and save the user profile, for example to associate an additional credit card number, to delete an association, or to modify a payment schedule for one or more of the associated credit cards.

Figure 4:
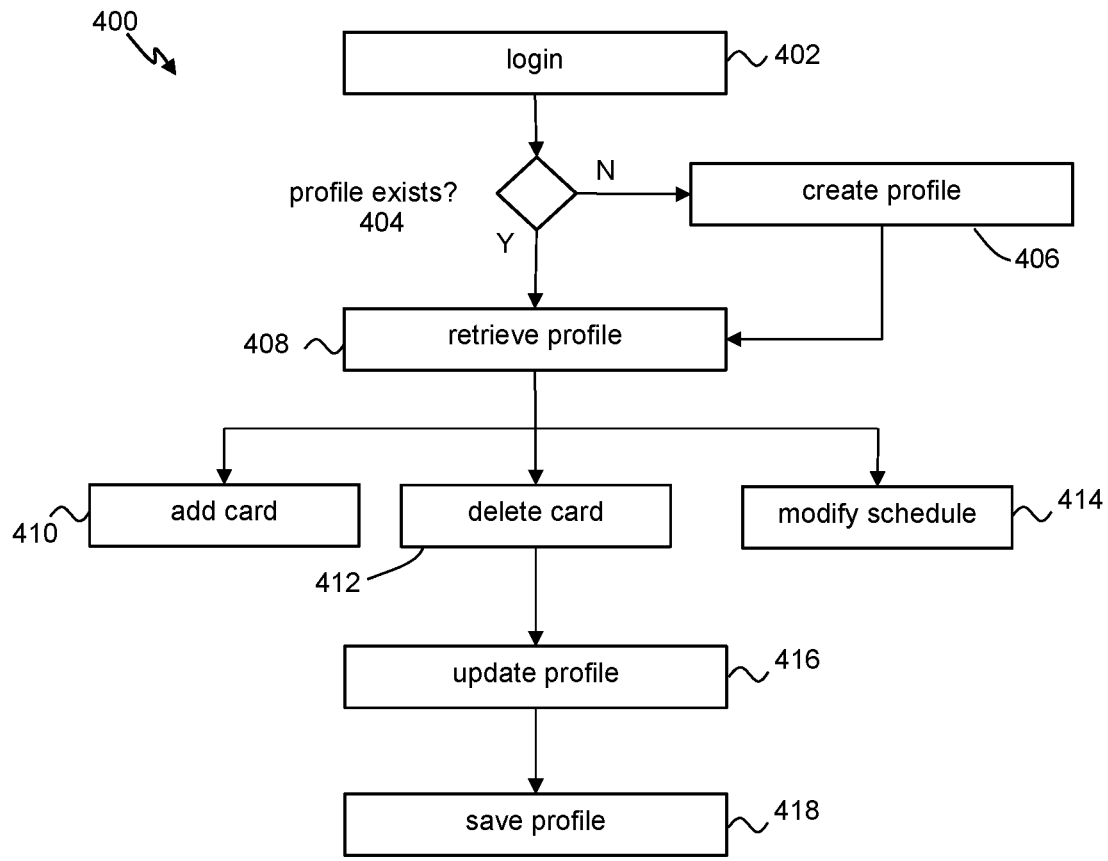
FIG. 4 is a flow chart of a computer-implemented process for registering credit cards in a user profile.

For example, as shown in the process 400 of FIG. 4, at step 402 a user at user device 120 may attempt to log in to web server 114 (e.g., via the browser component or the payment client component). If card registration component 256 determines, after querying user database 115 at step 404, that a user profile corresponding to the login details received from user device 120 does not exist, it may cause web server 114 to generate and serve a web page to user device 120 to prompt the user to create a profile, at step 406. Otherwise, the card registration component 256 retrieves the user profile, and may cause information in the user profile to be displayed in the browser component or a user interface of the payment client component, at step 408.

If a profile is to be created at step 406, the card registration component 256 may receive, from user device 120 (e.g. via the browser component) input data indicating an identifier (e.g. a PAN) of a payment device, such as a debit card, which is to be used to make payments, and an identifier (e.g. a PAN) of at least one credit card which is to be paid. An association between the credit card identifier and debit card identifier can be stored in a user profile which is then stored in user database 115.

Once a user profile is created or retrieved, card registration component 256 may cause to be displayed, in the browser component or the payment client component, a number of options for the user to update the user profile. For example, the user may add a credit card to be associated with the debit card, at step 410. An existing associated credit card may be deleted, at step 412. The manner of payment of each respective credit card may be specified or modified, at step 414. For example, the user may specify that a credit card be paid in full as soon as a bill for that credit card is received, at the end of the month in which the bill is received, or a day before the due date of the bill. In another example, the user may specify that the minimum payable amount (derived from the credit card bill data transmitted by the credit card issuer system 130 or 132) be paid on or shortly before the due date. In a further example, the user may specify a fixed dollar amount or percentage of the total bill to be paid on a particular day of the month (e.g., a day after salary or other income is credited to the account linked to the debit card).

Once the user confirms any modification to the user profile, the user profile is updated (step 416) and the card registration component 256 stores the updated user profile in user database 115.

Figure 5:
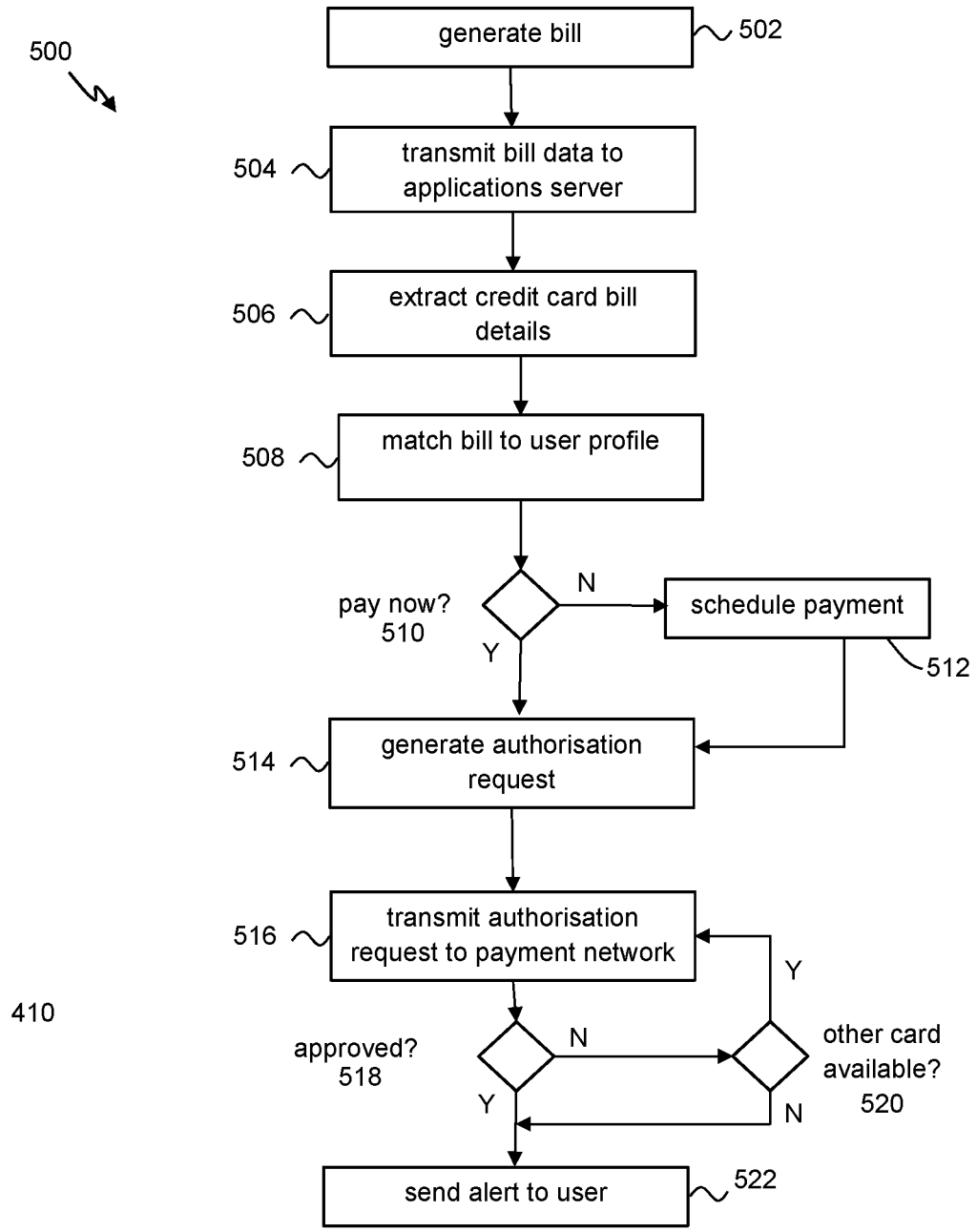
FIG. 5 is a flow chart of a computer-implemented payment card transaction process.

Turning now to FIG. 5, there is shown an exemplary automatic credit card payment process 500. At step 502 a credit card issuer system 130 or 132 generates a credit card bill, and at step 504, transmits the credit card bill to the applications server 110.

The credit card bill may be transmitted in a format which is readily parsed, at step 506, by the bill processing component 250 of applications server 110 in order to determine the relevant details of the credit card bill, such as the credit card number, the total amount of the bill, the minimum payable amount and the due date. In some embodiments the credit card bill may be transmitted in an alternative format, such as PDF. In this case the bill processing component 250 may use an optical character recognition algorithm or other text recognition algorithm to extract the relevant information from the credit card bill.

At step 508 the bill processing component 250 queries the user database 115 to match the credit card number from the credit card bill to a user profile. Once a matching profile is found, bill processing component 250 checks the settings for the matching credit card number in the user profile, at step 510, to determine whether the bill is to be paid immediately. If not, then at step 512, the bill processing component 250 invokes the scheduling component 254, which determines from the user profile the time and date at which the bill should be paid.

At step 514, which may occur immediately after step 510 or at a time and date determined by the scheduling component 254, the bill payment component 252 determines, from the settings for the matching credit card number in the user profile, the amount which is to be transferred into the account linked to the credit card number. For example, as discussed above, the amount to be paid may be nominated in the user profile as the total amount payable, the minimum amount payable, or a fixed value or percentage of the total amount payable. The bill payment component 252 also generates, using the credit card number, the debit card number and the nominated payment amount, a transaction authorisation request, which at step 516 is routed to the payment network 150 for processing as described previously.

The bill payment component 252 receives an authorisation response at step 518, and checks whether the transaction was approved. If it was declined, then at step 520 the bill payment component 252 may analyse the user profile to determine whether any other debit card is available to use for payment. If so then the process returns to step 514. Otherwise, the process 500 proceeds to step 522.

At step 522, an alert message is generated by the bill payment component 252. The alert message may indicate whether the transaction was declined (and may also indicate the reason why, e.g., insufficient funds), or whether it was approved. The alert message may be transmitted to the user. For example, the alert message may be sent as an email message to an email address stored in the user profile, by SMS to a mobile phone number stored in the user profile, or by any other messaging service with which the user has an account the details of which are saved in the user profile for the purpose of providing alerts.

In some embodiments, the information stored in the user profiles of user database 115 may be used to derive insights regarding cardholder behaviour. In particular, the association of multiple credit cards with one or more debit cards of a user provides a link between the credit cards. The transactions database 154 may be queried by a transactions analysis component 156 to identify all transactions made by the linked credit cards, and aggregated quantities, such as the total number of transactions or the total value of transactions, may be calculated for each credit card. This may provide an understanding of which credit card is the primary or "top of wallet" card for the user. The transactions analysis component 156 may compute other aggregated quantities, such as the proportion of spend for each of a number of merchant categories, for each credit card.

In some embodiments, the transactions analysis component 156 may determine a product type for each credit card for a single user or across all users in the user database 115, and compute aggregate quantities for each product type, in order to be able to make a comparison across products. For example, the transactions analysis component 156 may compute total or average spend in a year for users who hold both an OCBC Platinum MasterCard and a POSB Everyday MasterCard, and determine whether one or the other is preferred by particular users or on average. In some embodiments the transactions analysis component 156 may compute a proportional spend for each card in a user's profile, to allow for comparison across users, for example. The transactions analysis component 156 may determine, for a particular user or on average, whether a particular credit card or product type is used for certain types of transactions. For example, the transactions analysis component 156 may compute, based on merchant category codes associated with the transactions of a particular user, a proportion of spend by the user in different merchant categories (e.g., grocery stores, restaurants and convenience stores) to determine whether a particular credit card is preferred for use at merchants in particular merchant categories.

The product type for a credit card may be determined from a lookup table which matches individual card numbers or ranges of card numbers to products. Credit card product data may be stored in a product database having an entry for each product type. Each entry may comprise a name of the product, and various other values such as an annual interest rate, an annual fee, or a rewards program type. The transactions analysis component 156 may, for a transaction data set comprising a plurality of transaction records, extract demographic information from the transaction records, and for one or more products in the product database, analyse the transaction records to determine any trends in the spending pattern of cardholders in different segments for the one or more products. For example, the transactions analysis component 156 may analyse the transaction records to determine whether cardholders of a certain age range use their credit cards in a different way than cardholders of another age range, or whether cardholders living in a particular city use their cards differently than cardholders living in another city.

In order to perform such analyses for a given product, the transactions analysis component 156 may query the products database to identify credit card numbers (or ranges thereof) corresponding to the product, and then query the transactions database to identify transaction records matching the identified credit card numbers, for example.

Whilst the foregoing description has described exemplary embodiments, it will be understood by those skilled in the art that many variations in details of design, construction and/or operation may be made without departing from the scope of the present invention.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The invention claimed is:

1. A system comprising:
a user database configured to store a plurality of user profiles, each user profile comprising a mapping from a payment card identifier to a plurality of credit card numbers and a user-specified payment amount for each of the plurality of credit card numbers, wherein the payment card identifier is associated with one or more of a deposit account or a payment device comprising a positive balance, and wherein each of the plurality of credit card numbers is associated with a line of credit;
a user interface configured to:
receive, from a user device, login credentials;
determine, based on the login credentials, that no user profile of the plurality of user profiles is associated with the login credentials;

provide, at the user device, a prompt to create a user profile;

receive, from the user device, a first payment card identifier, a first plurality of credit card numbers, and a first user-specified payment amount for each of the first plurality of credit card numbers generate a new user profile comprising a mapping from the first payment card identifier to the first plurality of credit card numbers and the first user-specified payment amount for each of the first plurality of credit card numbers, wherein the new user profile is stored in the user database;

a bill processing component in communication with the user database configured to:

receive, from a credit card issuer system, a file comprising credit card bill data associated with the first credit card number of the first plurality of credit card numbers;

extract, using optical character recognition, at least the first credit card number, a total payable amount, and a minimum payable amount from the file comprising the credit card bill data;

query the user database to match the new user profile to the first credit card number based on the mapping of the first credit card number to the first payment card identifier associated with the matched user profile; and store, in the matched user profile, the total payable amount and the minimum payable amount extracted from the file comprising the credit card bill data; and a bill payment component configured to:

generate, based on the total payable amount and the minimum payable amount extracted from the file comprising the credit card bill data and the payment card identifier of the matched profile, a transaction authorization request comprising the payment card identifier of the matched user profile, the first credit card number, and the first user-specified payment amount indicated by the matched user profile for the first credit card number;

determine, based on at least a portion of the first credit card number, a payment network associated with the credit card issuer system; and transmit, to the payment network associated with the credit card issuer system, the transaction authorization request, wherein the transaction authorization request causes the payment network associated with the credit card issuer system to process the transaction authorization request and initiate a transfer of funds from an account associated with the first payment card identifier to an account associated with the first credit card number.

2. The system of claim 1, wherein the payment amount is the total payable amount.

3. The system of claim 1, wherein the payment amount is the minimum payable amount.

4. The system of claim 1, further comprising a scheduling component which is operably coupled to the bill payment component, and which is configured to transmit the transaction authorization request based on a user-defined time stored in the matched profile.

5. The system of claim 1, further comprising a card registration component which is configured to:

receive, from a user device, a payment card identifier and one or more credit card numbers;

generate a new user profile associating the payment card identifier and the one or more credit card numbers; and store the new user profile in the user database.

6. The system of claim 1, wherein the bill payment component is configured to:

receive, from the payment network, an authorization response; and transmit, to a user device associated with the matched profile, a status message indicating success or failure of the authorization request.

7. A method comprising:

storing a plurality of user profiles in a user database, each user profile comprising a mapping from a payment card identifier to a plurality of credit card numbers and a user-specified payment amount for each of the plurality of credit card numbers, wherein the payment card identifier is associated with one or more of a deposit account or a payment device comprising a positive balance, and wherein each of the plurality of credit card numbers is associated with a line of credit;

receiving, at a user interface from a user device, login credentials;

determining, based on the login credentials, that no user profile of the plurality of user profiles is associated with the login credentials;

providing, at the user device, a prompt to create a user profile;

receiving, from the user device, a first payment card identifier, a first plurality of credit card numbers, and a first user-specified payment amount for each of the first plurality of credit card numbers;

generating a new user profile comprising a mapping from the first payment card identifier to the first plurality of credit card numbers and the first user-specified payment amount for each of the first plurality of credit card numbers, wherein the new user profile is stored in the user database;

receiving, by a bill processing component from a credit card issuer system, a file comprising credit card bill data associated with the first credit card number of the first plurality of credit card numbers;

extracting, using optical character recognition, at least the first credit card number, a total payable amount, and a minimum payable amount from the file comprising the credit card bill data;

querying the user database using the bill processing component to match the new user profiles to the first credit card number based on and the mapping of the first credit card number to the first payment card identifier associated with the matched user profile;

storing, in the matched user profile, the total payable amount and the minimum payable amount extracted from the file comprising the credit card bill data;

generating, by a bill payment component and based on the total payable amount and the minimum payable amount extracted from the file comprising the credit card bill data and the payment card identifier of the matched profile, a transaction authorization request comprising the payment card identifier of the matched user profile, the first credit card number, and the first user-specified payment amount indicated by the matched user profile for the first credit card number;

determining, based on at least a portion of the first credit card number, a payment network associated with the credit card issuer system; and transmitting, by the bill payment component to the payment network associated with the credit card issuer system via the credit card issuer system, the transaction authorization request, wherein the transaction authorization request causes the payment network associated with the credit card issuer system to process the transaction authorization request and initiate a transfer of funds from an account associated with the first payment card identifier to an account associated with the first credit card number.

8. The method of claim 7, wherein the payment amount is the total payable amount.

9. The method of claim 7, wherein the payment amount is the minimum payable amount.

10. The method of claim 7, further comprising transmitting, by a scheduling component which is operably coupled to the bill payment component, the transaction authorization request based on a user-defined time stored in the matched profile.

11. The method of claim 7, further comprising receiving, by a card registration component from a user device, a payment card identifier and one or more credit card numbers; generating, by the card registration component, a new user profile associating the payment card identifier and the one or more credit card numbers; and storing, by the card registration component, the new user profile in the user database.

12. The method of claim 7, further comprising:
receiving, by the bill payment component from the payment network, an authorization response; and
transmitting, by the bill payment component to a user device associated with the matched profile, a status message indicating success or failure of the authorization request.

13. A non-transitory computer-readable medium having computer-readable instructions stored thereon, which, when executed by at least one processor, cause the at least one processor to:
store a plurality of user profiles in a user database, each user profile comprising a mapping from a payment card identifier to a plurality of credit card numbers and a user-specified payment amount for each of the plurality of credit card numbers, wherein the payment card identifier is associated with one or more of a deposit account or a payment device comprising a positive balance, and wherein each of the plurality of credit card numbers is associated with a line of credit;
receive, at a user interface from a user device, login credentials;
determine, based on the login credentials, that no user profile of the plurality of user profiles is associated with the login credentials;
provide, at the user device, a prompt to create a user profile;
receive, from the user device, a first payment card identifier, a first plurality of credit card numbers, and a first user-specified payment amount for each of the first plurality of credit card numbers;
generate a new user profile comprising a mapping from the first payment card identifier to the first plurality of credit card numbers and the first user-specified payment amount for each of the first plurality of credit card numbers, wherein the new user profile is stored in the user database;
receive, from a credit card issuer system, a file comprising credit card bill data associated with the first credit card number of the plurality of credit card numbers;
extract, using optical character recognition, at least the first credit card number, a total payable amount, and a minimum payable amount from the file comprising the credit card bill data;
query the user database using the bill processing component to match one of the user profiles to the first credit card number based on and the mapping of the first credit card number to the payment card identifier associated with the matched user profile;
store, in the matched user profile, the total payable amount and the minimum payable amount extracted from the file comprising the credit card bill data;
generate, based on the total payable amount and the minimum payable amount extracted from the file comprising the credit card bill data and the payment card identifier of the matched profile, a transaction authorization request comprising the payment card identifier of the matched profile, the first credit card number, and the first user-specified payment amount indicated by the matched user profile for the first credit card number;
determine, based on at least a portion of the first credit card number, a payment network associated with the credit card issuer system; and
transmit, to the payment network associated with the credit card issuer system via the credit card issuer system, the transaction authorization request, wherein the
transaction authorization request causes the payment network associated with the credit card issuer system to process the transaction authorization request and initiate a transfer of funds from an account associated with the first payment card identifier to an account associated with the first credit card number.

14. The non-transitory computer-readable medium of claim 13, wherein the payment amount is the total payable amount.

15. The non-transitory computer-readable medium of claim 13, wherein the payment amount is the minimum payable amount.

16. The non-transitory computer-readable medium of claim 13, wherein the computer-readable instructions further comprise instructions, which, when executed by the at least one processor, cause the at least one processor to transmit the transaction authorization request based on a user-defined time stored in the matched profile.

17. The non-transitory computer-readable medium of claim 13, wherein the computer-readable instructions further comprise instructions, which, when executed by the at least one processor, cause the at least one processor to:
receive, from a user device, a payment card identifier and one or more credit card numbers;
generate a new user profile associating the payment card identifier and the one or more credit card numbers; and
store the new user profile in the user database.

18. The system of claim 1, wherein the portion of the first credit card number comprises an issuer identification number that identifies the payment network associated with the credit card issuer system.

19. The method of claim 7, wherein the portion of the first credit card number comprises an issuer identification number that identifies the payment network associated with the credit card issuer system.

20. The non-transitory computer-readable medium of claim 13, wherein the portion of the first credit card number comprises an issuer identification number that identifies the payment network associated with the credit card issuer system.

\* \* \* \* \*